United States Patent [19]

Schmidt et al.

[11] Patent Number: 5,288,408
[45] Date of Patent: Feb. 22, 1994

[54] METHOD OF GELATIN RECOVERY AND PURIFICATION FROM ENCAPSULATION PROCESSES

[75] Inventors: William J. Schmidt, Dresher; Michael F. Smith, Springfield; James W. Neal III, King of Prussia, all of Pa.

[73] Assignee: Chemical Industry Consultants, Inc., Springfield, Pa.

[21] Appl. No.: 965,965

[22] Filed: Oct. 26, 1992

[51] Int. Cl.$^5$ .................. B01D 11/00; B01D 35/18
[52] U.S. Cl. .................. 210/634; 210/774; 210/257.1; 210/181; 210/231; 210/319; 530/355; 203/11; 252/315.01
[58] Field of Search .............. 210/774, 181, 231, 295, 210/315, 257.1, 738, 634, 773; 202/73, 75; 203/11; 252/315.01; 530/355

[56] References Cited

U.S. PATENT DOCUMENTS

| | | | |
|---|---|---|---|
| 2,663,130 | 12/1953 | Donofrio | 53/89.5 |
| 3,142,667 | 7/1964 | Grettie et al. | 530/355 |
| 3,269,088 | 8/1966 | Kath | 53/184 |
| 3,332,782 | 7/1967 | Wingerd et al. | 530/355 |
| 3,579,960 | 5/1971 | Mehta | 53/184 |
| 3,582,472 | 6/1971 | Framz | 203/72 |
| 3,756,759 | 9/1973 | Weyers | 425/270 |
| 4,151,161 | 4/1979 | Smith | 530/355 |
| 4,477,469 | 10/1984 | Herschler | 424/322 |
| 4,483,829 | 11/1984 | Guardini | 530/355 |
| 4,567,714 | 2/1986 | Chasman | 53/438 |
| 4,866,048 | 9/1989 | Calverley et al. | 514/167 |
| 4,894,978 | 1/1990 | Schonmann et al. | 53/560 |
| 5,074,102 | 12/1991 | Simpson | 53/454 |
| 5,210,182 | 5/1993 | Nasrallah et al. | 530/355 |

Primary Examiner—Robert A. Dawson
Assistant Examiner—Ana M. Fortuna
Attorney, Agent, or Firm—Robert S. Lipton

[57] ABSTRACT

The subject invention relates generally to a novel method of recycling gelatin-based encapsulation waste material and, more specifically, to a process for the recovery and purification of gelatin and softening agents therefrom. In the preferred embodiment, deionized water is added to the waste material thereby forming an aqueous solution of gelatin and glycerine dispersed within the remaining oil and residual active-ingredient components of the waste material. Extraction methods are employed under specific conditions to effect separation of the bottom aqueous phase from the upper oil phase. The lower phase is hot filtered to remove any remaining traces of oil or other contaminants and the filtrate is then charged to a concentration vessel adapted for vacuum distillation. The water solvent is thus removed under specific thermal and atmospheric conditions until the desired concentration of gelatin and glycerine is achieved. A pure, concentrated aqueous gelatin-glycerine solution results which may be stored or further prepared for immediate reuse.

22 Claims, 1 Drawing Sheet

METHOD OF GELATIN RECOVERY AND PURIFICATION FROM ENCAPSULATION PROCESSES

The subject invention is directed to a process for the recycling of gelatin waste, and derivatives thereof, resulting from industrial encapsulation processes.

BACKGROUND OF THE INVENTION

Gelatin and gelatin derivatives are used to encapsulate the products of several industries. Examples are described in U.S. Pat. No. 5,074,102 of Simpson et al. issued Dec. 24, 1991, and include the encapsulation of medicinal compounds such as drugs or vitamins; employment of gelatin encapsulation in food packaging, such as for powdered instant coffee or spices; in candy manufacturing; in fertilization of ornamental plants and/or indoor plants; in packing of sensitive seeds in combination with protective agents and/or fertilizers; and in the packing of single dyestuffs or mixtures of various drugs.

In each of the above-recited manufacturing and production processes, a certain amount of the encapsulating material is lost as waste. Frequently, this amount approaches 50% or more, depending on the method and arrangement of production employed. When considering that the cost of the encapsulating material in the United States averages approximately $1.80 per pound ($3.40 per kilo), it is clear that the economic consequences of such waste can be significant. As a result, manufacturers have attempted to off-set poor production efficiency by recycling the waste material for reuse. Such attempts, however, have not been met with a great deal of success.

Prior art methods of gelatin recovery and purification suffer from a variety of shortcomings to be discussed in further detail below. Before these shortcomings can be fully appreciated, however, the composition of the encapsulation waste material itself should be further understood. In general, waste material of encapsulation processes are comprised of a variable number of components added to a gelatin base. Among them are solvents (usually water); softening agents and oil coatings (when desired) and contaminants in the form of residual active ingredients (the substance to be encapsulated). In addition, colorings and preservatives may also be added. Thus, it can be observed that successful recycling involves not only the recovery of gelatin from surrounding oils, but also the removal of the remaining components of the waste, to achieve a pure, reusable product.

Extraction has been the principle method for accomplishing removal of oils, actives and the like in the pharmaceutical industry. While several solvents have been used in the prior art in an effort to accomplish separation, each suffer from a variety of shortcomings not the least of which is the necessity of ultimately removing yet another component, the solvent itself, from the recycled materials. To date, the most popular and widely used solvents used to separate gelatin from oils and actives are chlorinated solvents such as 1,1,1-trichloroethane with naptha, for example. The use of chlorinated solvents, however, is accompanied by high costs, disposal problems and most importantly, environmental concerns. Other solvents have also been attempted, including: isopropyl alcohol, methyl isobutyl ketone, toluene, hexane, acetone and acetone:water mixtures, but with insufficient yields and/or poor separation results. Some of these chemicals are relatively expensive and present similar environmental, disposal and safety concerns. None of them have been found to separate out oils and actives with a high degree of efficiency.

It is clear that a significant need exists for a solution that addresses not only qualitative and quantitative concerns with the recycled end-product, but also the practical considerations of cost and environmental safety. Little progress had been achieved in developing a comprehensive solution that completely obviates all of the shortcomings of prior art until the advent of the subject invention described below.

SUMMARY OF THE INVENTION

The subject invention relates generally to a novel method of recycling gelatin-based encapsulation waste material and, more specifically, to a process for the recovery and purification of gelatin and softening agents therefrom. In the preferred embodiment, deionized water is added to the waste material thereby forming an aqueous solution of gelatin and glycerine dispersed within the remaining oil and residual active-ingredient components of the waste. Extraction methods are employed under specific conditions to effect separation of the bottom aqueous phase from the upper oil phase. The lower phase is hot filtered to remove any remaining traces of oil or other contaminants and the filtrate is then charged to a concentration vessel adapted for vacuum distillation. The water solvent is thus removed under specific temperature and atmospheric conditions until the desired concentration of gelatin and glycerine is achieved. A pure, concentrated aqueous gelatin-glycerine solution results which may then be store or further prepared for immediate reuse.

It is, therefore, a primary object of the subject invention to provide a method of recycling waste encapsulation material whereby complete separation of the gelatin and softeners from the oil and active ingredient components is achieved.

Another object of the subject invention is to provide a method of recovering and purifying gelatin that minimizes thermal degradation of the target material.

It is also an object of the present invention to provide a method of recycling waste encapsulation material that is efficient (yield + time of separation), inexpensive and simple to perform.

Still another object of the present invention is to provide a recycled gelatin product with chemical and physical properties identical to virgin gelatin such that reuse may be successfully accomplished.

Yet another object of the present invention is to provide a method of recycling waste encapsulation material that employs only environmentally safe constituents and further that has no hazardous by-products.

Other objects and advantages of the present invention will be apparent upon reference to the accompanying description when taken in conjunction with the following drawing.

DETAILED DESCRIPTION OF THE PREFERRED EMBODIMENT

Figure 1:
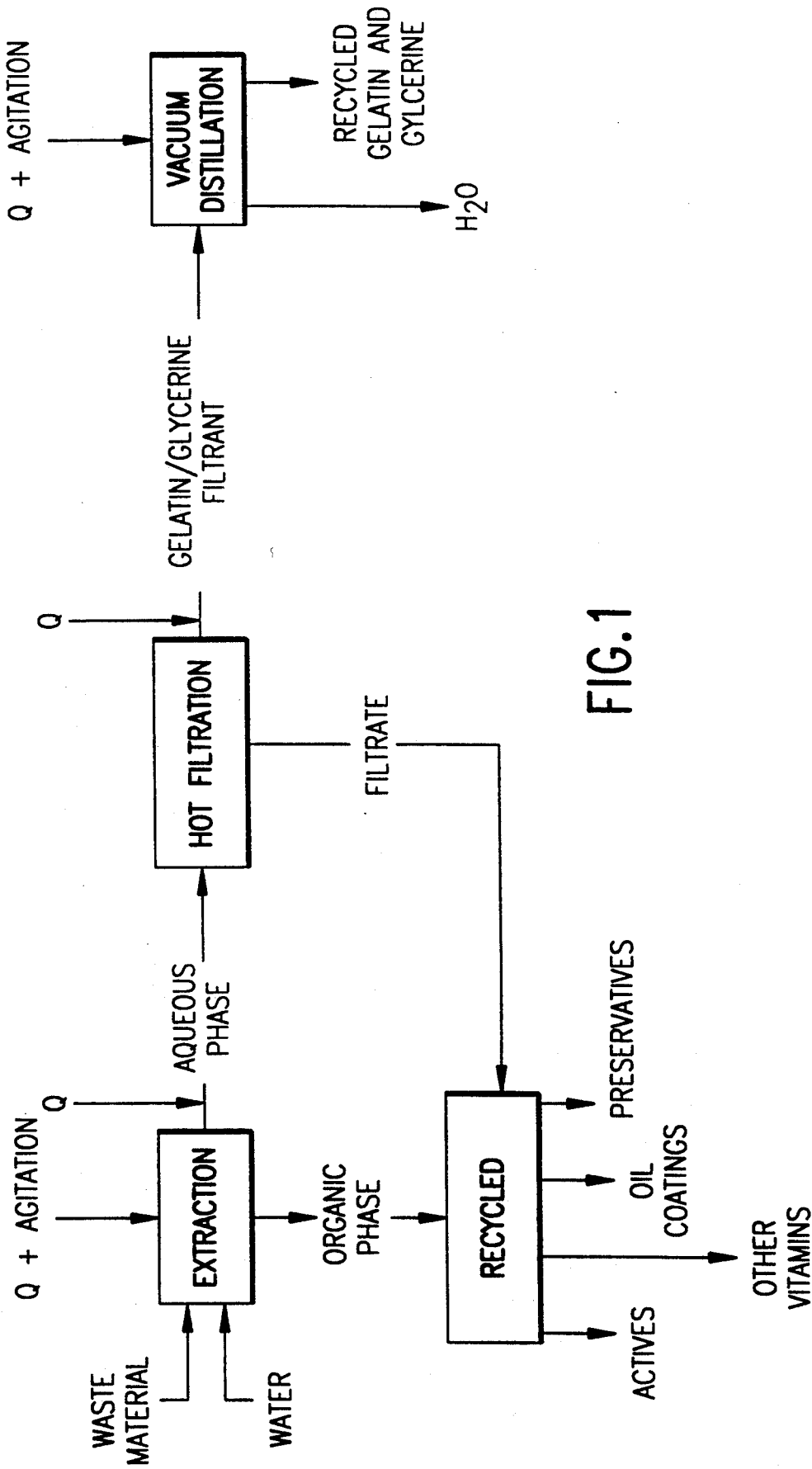
FIG. 1 illustrates in diagrammatic form the subject method of gelatin recovery and purification.

Gelatin is a protein derivative of collagen obtained, in general, by the boiling of skin, white connective tissues and bones of animals, and by the partial hydrolysis of collagen, in particular. As a colloid it has unique physical properties. Of particular significance to the present invention is its tendency to stay in solution and its ability to form dispersions in oils. Gelatin remains a solid at standard atmospheric pressure and temperature absent the presence of a solvent in sufficient quantities.

Softening agents are sometimes added to plasticize the gelatin when soft, globular, gelatin shells are desired. Agents such as glycerin, sorbitol, or other similar polyols are commonly employed to achieve these characteristics.

The soft elastic capsule-forming material will thus be used to enclose active ingredients in the form of powders, liquids or combinations thereof. Oils, such as vitamin A, vitamin E and beta-carotene, for example, are frequently encapsulated in the pharmaceutical industry. Additionally, other oils like mineral oil may be used to coat the outer surface of the gel-capsule during processing. Thus, it can be seen that the encapsulation waste product may have many components to be removed for reuse. In some instances, coloring agents and preservatives may also be incorporated into the encapsulation melt. Commonly used preservatives are methyl- and propylparabens and sorbic acid.

As stated above, present methods of encapsulation lose as much as 50% of the melt during processing, the balance of which is either discarded as a waste by-product or recycled. The latter option requires the removal of all of the above components with the exception of gelatin and glycerine. The present invention provides a novel and efficient method of accomplishing same without experiencing the shortcomings of the prior art. It should be understood that other proteins with physical and chemical properties similar to gelatin exist and may also be recycled by the subject invention. Similarly, glycerine is only one example of a softening agent which may be recovered; thus, neither gelatin nor glycerine are intended to be limiting.

Reference is now made to FIG. 1 in which there is illustrated in diagrammatic form the preferred embodiment of the subject method of gelatin and glycerine recovery and purification. Deionized water is added to a separation vessel adapted with a heating jacket and is preheated to between 60° C. and 70° C. The waste material to be recycled is then charged to the separation vessel which may be of stainless steel or glass-lined steel construction and sized according to batch size. The vessel is also adapted with agitation means. The waste material to be recovered is diluted with the D.I. water at standard atmosphere and in the presence of heat to a preferred concentration of 10% to 12% gelatin/glycerine by weight, and a mass temperature in the above-recited range. Agitation is simultaneously performed to effect dissolution of the gelatin and glycerine which should be almost immediate.

Thus it will be appreciated that an aqueous solution of gelatin and glycerine is formed and dispersed within the remaining oil and residual active-ingredient components. It was found through experimentation that the above recited 10% to 12% concentration value is the optimum concentration for achieving rapid and thorough separation of the two layers.

Once the gelatin is completely dissolved, agitation is ceased and the entire mass is allowed to stand. For a batch size of 150 kilos, it was observed that approximately 1-3 hours were required for separation. Recall that gelatin is a colloid and will not readily settle out of solution. Separation of the lower aqueous phase from the upper oil phase is facilitated by a sight glass incorporated into the recycling apparatus. Accordingly, differences between the two phases is visually determined to effect accurate separation. Furthermore, extraction of the lower phase is carried out through a heated transfer conduit to avoid solidification of the solution. A temperature range of between 30° C. and 40° C. was found to be sufficient. It should be noted, incidentally, that the upper phase may contain the lubricating or coating oils, active ingredients, coloring and preservatives described above which may themselves be subject to certain novel recycling techniques. Because the subject invention provides for efficient separation of gelatin and glycerine from the waste, the remaining components on the upper phase will similarly have a greater degree of purity. The subject invention, therefore, provides a method for more efficient recovery of active ingredients. This is particularly useful when lots of active ingredients fail to be properly encapsulated and recovery and purification of the actives can result in significant cost savings.

Next, the lower phase is hot filtered to remove any remaining traces of oil or other contaminants. Stainless steel filtration equipment may be employed such as a plate filter, or a coated plate filter like, for example, a Sparkler filter. Alternatively, nutche filters of the Rosenmund type or cartridge filters may be used for the purpose. Here again, the residue may be recaptured for further separation and purification if desired although the amounts involved at this point may not warrant the effort.

Depending on the concentration of gelatin in the resulting filtrate, distillation may be required to remove amounts of the water solvent. To recycle solutions greater than 10% to 12% the aqueous solution is charged to a concentration vessel adapted for vacuum distillation. The desired concentration for reuse is between 10% and 50% by weight of recycled gelatin. Once again, heated transfer conduit are employed to prevent solidification. The concentration vessel is of stainless steel construction sized according to batch size and is also equipped with agitation means and a heating jacket to control mass temperature as in the preceding step.

Distillation is carried out under reduced pressure to facilitate the removal of water at a lower temperature. At standard atmosphere, temperatures $\geq$ than 100° C. are required to remove water. Such temperatures cause decomposition of the protein-based gelatin which affects its bloom strength. Bloom strength is a measurable physical property of gelatin related to its ability to bond with itself during the encapsulation process and yield a stable capsule product. Cracking along seams of capsules is frequently observed when bloom strength is reduced thereby releasing all or part of the enclosed active ingredients. Thermal degradation is minimized in the subject process by carrying out vacuum distillation $\geq 25''$ HgA and $\leq 60°-70°$ C. Pressure reduction is accomplished through integration of the concentration vessel with a vacuum system. The water distalent is passed through a condenser and collected in a separate container for measurement to calculate the gelatin/glycerine concentration.

After the desired concentration of recycled gelatin is reached the concentration vessel is returned to atmospheric pressure. Storage of recycled gelatin and glycerine is usually preferred at concentrations of greater than 12% at room temperature when the material is in a solid form. In the alternative, virgin gelatin along with glycerine and water, if necessary, may be charged to the concentration vessel containing the concentrated aqueous recycled material for the production of a recycled encapsulation melt.

It is understood that the above described recycling system may be incorporated into a conventional encapsulation apparatus to provide repeated or continual recycling of waste encapsulation materials.

Although the present invention has been described with reference to the particular embodiments herein set forth, it is understood that the present disclosure has been made only by way of example and that numerous changes in details of construction may be resorted to without departing from the spirit and scope of the invention. Thus, the scope of the invention should not be limited by the foregoing specifications, but rather only by the scope of the claims appended hereto.

What is claimed is:

1. A process for the recovery and purification of waste gelatin and glycerine resulting from the manufacture of soft gelatin capsules, which comprises the steps of:
   (a) effecting dissolution of the gelatin and glycerine components of the waste in water such that an aqueous gelatin/glycerine solution dispersed within the remaining components of said waste is formed;
   (b) permitting said dispersion to settle into an upper oil phase and a lower aqueous gelatin/glycerine solution phase;
   (c) separating said lower phase from said upper phase.
   (d) hot filtering said lower phase to remove traces of said remaining components of said upper phase; and
   (e) distilling at reduced pressure said lower phase until the desired concentration of gelatin and glycerine is achieved.

2. The process for recovering and purifying waste gelatine and glycerine of claim 1, wherein said water is deionized water preheated to facilitate dissolution of said gelatin and glycerine.

3. The process for recovering and purifying waste gelatin and glycerine of claim 2, wherein said deionized water is preheated to between 60°–70° C.

4. The process for recovering and purifying waste gelatin and glycerine of claim 1, further comprising the step of agitating said waste to further facilitate dissolution of the gelatin and glycerine in water.

5. The process for recovering and purifying waste gelatin and glycerine of claim 1, wherein the concentration of gelatin and glycerine in water is 10 to 12 percent by weight, such that optimal separation of said aqueous gelatin/glycerine solution from said remaining components of said waste may be accomplished.

6. The process for recovering and purifying waste gelatin and glycerine of claim 1, wherein the step of hot filtering said aqueous gelatin/glycerine solution is accomplished by use of one of the following filters:
   (a) a plate filter;
   (b) a coated plate filter;
   (c) a nutche filter; or
   (d) a cartridge filter.

7. The process for recovering and purifying waste gelatin and glycerine of claim 1, wherein the step of distilling at reduced pressure of said aqueous gelatin/glycerine solution is performed at $\geq 25''$ of HgA.

8. A recycled gelatin and glycerine product prepared in accordance with the method of claim 1, and having purity and bloom strength superior to any recycled gelatin and glycerine formerly observed.

9. The recycled gelatin and glycerine product of claim 8, wherein said recycled gelatin has a concentration between 10% and 50% by weight such that it is suitable for reuse.

10. The process for recovering and purifying waste gelatin and glycerine of Claim 1, wherein the step of distilling at reduced pressure said lower phase is carried out at a temperature $\leq 70°$ C.

11. The process for the recovery and purification of waste gelatin and glycerine of claim 1, wherein said upper phase is comprised of at least one of the following waste components:
    (a) Lubricating oils;
    (b) Lubricating and coating oils;
    (c) Coloring agents;
    (d) Preservatives; and
    (e) Active ingredients.

12. An apparatus for the recovery and purification of waste gelatin and glycerine resulting from the manufacture of soft gelatin capsules, comprising:
    (a) a separation vessel;
    (b) means for hot filtration;
    (c) a concentration vessel adapted for vacuum distillation;
    (d) heated transfer conduits connecting said separation vessel with said means for hot filtration and connecting said means for hot filtration with said concentration vessel;
    (e) a vacuum system connected to said concentration vessel; and
    (f) a condenser connected to said concentration vessel.

13. The apparatus of claim 9, wherein said separation vessel is adapted with agitation means.

14. The apparatus of claim 9, wherein said separation vessel is adapted with a means for heating its contents.

15. The apparatus of claim 12, wherein said concentration vessel is further adapted with agitation means.

16. The apparatus of claim 12 wherein said concentration vessel is further adapted with a means for heating its contents.

17. The apparatus of claim 12 wherein said means for hot filtration is a plate filter.

18. The apparatus of claim 12 wherein said means for hot filtration is a coated plate filter.

19. The apparatus of claim 12 wherein said means for hot filtration is a nutche filter.

20. The apparatus of claim 12 wherein said means for hot filtration is a cartridge filter.

21. The apparatus of claim 9, further comprising means for detecting the occurrence of separation of an upper oil phase from a lower aqueous gelatin/glycerine phase.

22. The apparatus of claim 21, wherein said means for detecting the occurrence of separation is a site glass connected below said separation vessel.

* * * * *

UNITED STATES PATENT AND TRADEMARK OFFICE
CERTIFICATE OF CORRECTION

PATENT NO. : 5,288,408

DATED : February 22, 1994

INVENTOR(S) : William J. Schmidt, Michael F. Smith, James W. Neal, III

It is certified that error appears in the above-indentified patent and that said Letters Patent is hereby corrected as shown below:

Column 6, line 3, after the word "gelatin" "-" should be deleted.

Column 6, line 41, after the word "claim" the number "9" should be deleted, and the number "12" should be inserted.

Column 6, line 43, after the word "claim" the number "9" should be deleted, and the number "12" should be inserted.

Signed and Sealed this

Twenty-fifth Day of October, 1994

Attest:

BRUCE LEHMAN

*Attesting Officer*    *Commissioner of Patents and Trademarks*